United States Patent [19]

Cook et al.

[11] Patent Number: 5,500,928
[45] Date of Patent: Mar. 19, 1996

[54] DIGITAL PRINTING SYSTEM AND PROCESS USING ADAPTIVE COMPRESSION

[75] Inventors: Craig C. Cook, Wayland; Thomas P. Blumer, Cambridge; Theodore B. Packard, Arlington, all of Mass.; Geoffrey A. Dreher, Nashua, N.H.; Thomas A. Schuneman, Lincoln, Mass.

[73] Assignee: Xionics Document Technologies, Inc., Burlington, Mass.

[21] Appl. No.: 226,944

[22] Filed: Apr. 13, 1994

Related U.S. Application Data

[63] Continuation-in-part of Ser. No. 24,532, Mar. 1, 1993, abandoned.

[51] Int. Cl.⁶ .................................................. G06F 15/62
[52] U.S. Cl. .......................................................... 395/133
[58] Field of Search .................................. 395/140, 141, 395/133, 138, 139; 345/127, 118

[56] References Cited

U.S. PATENT DOCUMENTS

| | | | |
|---|---|---|---|
| 3,921,135 | 11/1975 | Komaru et al. | 340/146.3 |
| 4,660,029 | 4/1987 | Houda et al. | 340/744 |
| 4,725,815 | 2/1988 | Mitchell et al. | 340/347 |
| 4,829,468 | 5/1989 | Nonaka et al. | 364/900 |
| 5,050,100 | 9/1991 | Damon et al. | 364/514 |
| 5,129,049 | 7/1992 | Cuzzo et al. | 395/113 |
| 5,129,051 | 7/1992 | Cain | 395/133 |
| 5,133,049 | 7/1992 | Cain et al. | 395/133 |
| 5,138,561 | 8/1992 | Crowe | 395/103 |
| 5,150,454 | 9/1992 | Wood et al. | 395/114 |
| 5,159,665 | 10/1992 | Priem et al. | 395/134 |

FOREIGN PATENT DOCUMENTS

| | | |
|---|---|---|
| 0432896 | 12/1990 | European Pat. Off. . |
| 0470782A3 | 8/1991 | European Pat. Off. . |
| 3817585 | 12/1988 | Germany . |

Primary Examiner—Phu K. Nguyen
Attorney, Agent, or Firm—Stuart P. Meyer

[57] ABSTRACT

A system and process for digital printing divides an image area into segments, defines display lists for each segment, generates graphic primitives from page description language commands, stores the graphic primitives in the display lists, and adaptively compresses and converts the contents of display lists as memory requirements exceed available memory capacity. Display lists contain either uncompressed pixel representations, compressed pixel representations, graphic primitives, or combinations of the foregoing.

8 Claims, 8 Drawing Sheets

DIGITAL PRINTING SYSTEM AND PROCESS USING ADAPTIVE COMPRESSION

RELATED APPLICATION

This application is a continuation in part of U.S. patent application Ser. No. 08/024,532, filed on Mar. 1, 1993, now abandoned.

BACKGROUND AND FIELD OF THE INVENTION

This invention pertains generally to the field of digital printing systems, and specifically to a system and process of printing or otherwise displaying complex images using adaptive techniques to compress representations of image elements.

Conventional digital printing systems receive data corresponding to text and graphics in a variety of formats. These systems process such data to create a set of dots (or "pixels") on a page, which are perceived by a human observer as an image. It is conventional for such systems to represent image information in the memory of the printing system by setting a particular bit in the memory to be on or off depending upon whether a corresponding pixel is to be displayed as black or white. This is called a "bit map" or 37 pixel map" representation. In color systems, separate memory areas correspond to component colors and a number of bits may be used to represent a single pixel. Typical computer video display systems similarly rely on pixel-based representations of images.

A conventional technique for processing images is to incorporate a microprocessor into a printing device, and to program the microprocessor to interpret commands from an attached computer in accordance with the protocols of a page description language. Such subsystems are commonly known as "interpreters", and translate the printing commands from the attached computer into commands and data more easily processed by the printing device.

In practice, it is common for interpreters to decompose high-level commands corresponding to complex images into low-level commands representing, for instance, a collection of simple components known as "graphic primitives".

Two system architectures are commonly used in the industry for further processing of the low-level commands produced by page description language interpreters. The first, known as a "frame buffer", represents every pixel on a printed page as a separate bit or, in the case of color, as a set of bits in random access memory (RAM). Under this system, any page that can be described as a map of pixels can be printed. Frame buffer systems typically must process the information to be displayed on a frame-by-frame basis in which each frame must be rasterized and the data therein sent serially to the print engine. Furthermore, a substantial amount of frame buffer RAM is required to store information for the page, even when the image to be printed is extremely simple.

The second common architecture, known as "banding", stores all of the graphic primitives to be printed on the page, such as characters, graphics, images, and the like, in one or more "display lists" stored in the RAM of the printing system. A display list is typically a temporally-ordered list of graphic primitives for one area of the page, typically a horizontal band. Each display list is rasterized in turn into one of a small number of band bit maps (or "pixel maps"), or buffers, the contents of which are sent in turn to the print engine. The band buffers are reused during the processing of all the display lists of the page. Typically, most of the rasterization into band pixel maps occurs after the print engine has started to print the page. In the typical laser printer, the engine cannot be stopped in the middle of a page, so this rasterization must be fast enough to keep up with the print engine. In banding systems, relatively little RAM is required to print simple pages, and processing of one page while another page is printing is possible. However, for very complex images the size of the lists can exceed the RAM size of a comparable frame buffer system. Sufficient RAM for handling such complex images must be provided or an error will result. The requirement of real time rasterization of bands is often difficult to achieve, and an error will result if a band fails to rasterize by the time it is called for. The addition of RAM to banding systems can allow them to be converted to frame buffer systems when required.

One contributing factor to the cost and complexity of banding systems is that display list entries can quickly accumulate to an unmanageable size, not only eliminating the primary advantage of this technique but also giving rise to the possibility that not enough RAM will be available to store all of the desired display list entries.

It would be desirable to have a system and process for storing representations of graphics primitives in a manner that does not suffer the disadvantages of known approaches.

SUMMARY OF THE INVENTION

In accordance with the present invention, an image is drawn by spatially dividing an imaging area into a number of segments, creating a display list for each segment, determining for each received printing command which of the segments that command will affect, adding display list primitives to corresponding display lists based on that command, determining for each display list whether the display list is larger than an uncompressed pixel representation of the corresponding segment, and if so, converting the display list to an uncompressed pixel representation of the segment. In adding display list primitives to corresponding display lists, a display list primitive is added to a list that has been converted to a pixel representation by rasterizing the primitive and then combining the rasterized primitive with the existing pixel representation of the segment.

After all the printing commands for a page have been processed, the page image is printed by rasterizing each display list in turn and sending the uncompressed pixel representation of the corresponding segments to the printer.

In one aspect of the invention, a memory reduction process is executed as needed to free up memory for other uses in the system. The reduction process reclaims memory by repeatedly performing steps to reduce memory requirements, including waiting for a previous page to print so that memory from the corresponding display lists become available; compressing one or more of the uncompressed pixel representations; and compressing pixel data stored as an entry of a display list that does not contain solely a pixel representation of the corresponding segment.

A compressed pixel representation of a segment is treated as a display list entry, such that further display list entries may simply be added to the display list for that segment. When such display list grows to a size greater than a pixel representation, it may again be converted to a pure pixel representation of the corresponding segment. Thus, a segment may at various times be represented as a display list of primitives, an uncompressed pixel representation, a display list containing a compressed pixel representation, and a display list containing a compressed pixel representation as well as graphic primitives.

In another aspect of the invention, an image is drawn by spatially dividing an imaging area into a number of segments, creating a display list for each segment, determining for each received printing command which of the segments that command will affect, generating graphic primitives for each of the segments based on the command, determining whether the memory required to store those primitives exceeds the available capacity of the display list storage area and if it does, adaptively compressing a subset of the display lists to increase available capacity, updating the affected display lists with the new graphic primitives, and drawing the image using the updated display lists.

In a related aspect of the invention, the adaptive compression includes a reduction process that involves determining the size of a display list compared to an uncompressed pixel representation of a segment. Over-sized lists containing only graphic primitive representations are placed in order of decreasing size and then rasterized to reduce the amount of memory they require. Similarly, oversized lists containing both graphic primitives and compressed raster representations are converted into a more compact pure raster form. Lists in raster form are then placed in decreasing size order and compressed in sequence to make yet more memory available. Under-sized lists containing solely graphic primitives are also placed in order of decreasing size, are then provisionally rasterized and compressed, and the smaller of the compressed raster or original forms of each are stored. Similarly, under-sized lists containing compressed raster representations in addition to any graphic primitives are placed in decreasing size order, provisionally converted to raster form and compressed, and the smaller of the compressed raster or original forms are stored. Throughout this processing, checks are made to determine whether more memory is required, and the reduction process completes as soon as sufficient memory becomes available for an updating process that is to follow.

In yet another aspect of the invention, updating of display lists with new graphic primitives occurs in one of two ways, depending on the current contents of a display list. If a display list contains only an uncompressed pixel representation, then updating occurs by converting the new graphic primitives into pixel representations and combining the existing pixel representation with the new pixel representations. Otherwise, updating occurs by adding the new graphic primitives to the display list.

By using such techniques, compression is only performed on an as-needed basis, thereby decreasing the time and processing resources needed to store representations in display lists and also reducing the time and processing resources required to convert retrieved display lists into a pixel form suitable for transmission to the printing engine or other output device.

The features and advantages described in the specification are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

DETAILED DESCRIPTION OF THE DRAWINGS

The Figures depict a preferred embodiment of the present invention for purposes of illustration only. One skilled in the art will readily recognize from the following discussion that alternative embodiments of the structures and methods illustrated herein may be employed without departing from the principles of the invention described herein.

In order to describe the preferred embodiment, it may be helpful to first define the terms "high level command" and "graphic primitive".

High level commands are the graphics commands of a page description language such as the "PCL" or "POST-SCRIPT" page description languages of Hewlett-Packard Co. and Adobe Systems, Inc., respectively. An example sequence of high level commands to draw a polygon is:

4.113 12.237 MOVETO 8.000 12.237 LINETO 9.000 17.203 LINETO 1.000 17.203 LINETO

CLOSEPATH

FILL Graphic primitives are printing commands that are produced by a page description language interpreter from high level commands and are later rendered into pixels by a marking mechanism. Each graphic primitive specifies a particular shape at a particular location on the page. Examples are:

X Lines: An X Line primitive draws a horizontal line of length N, starting at a particular position (X,Y).

Trapezoid: A Trapezoid primitive draws a trapezoid having two horizontal sides, starting at a vertical position (Y1), an upper left corner at Y1 having a horizontal position (X1), an upper right corner at Y1 having a horizontal position (X2), a height (H), a left side slope ($\Delta X1$), and a right side slope ($\Delta X2$), where all values are typically expressed in a real-valued mathematical format.

Figure 1:
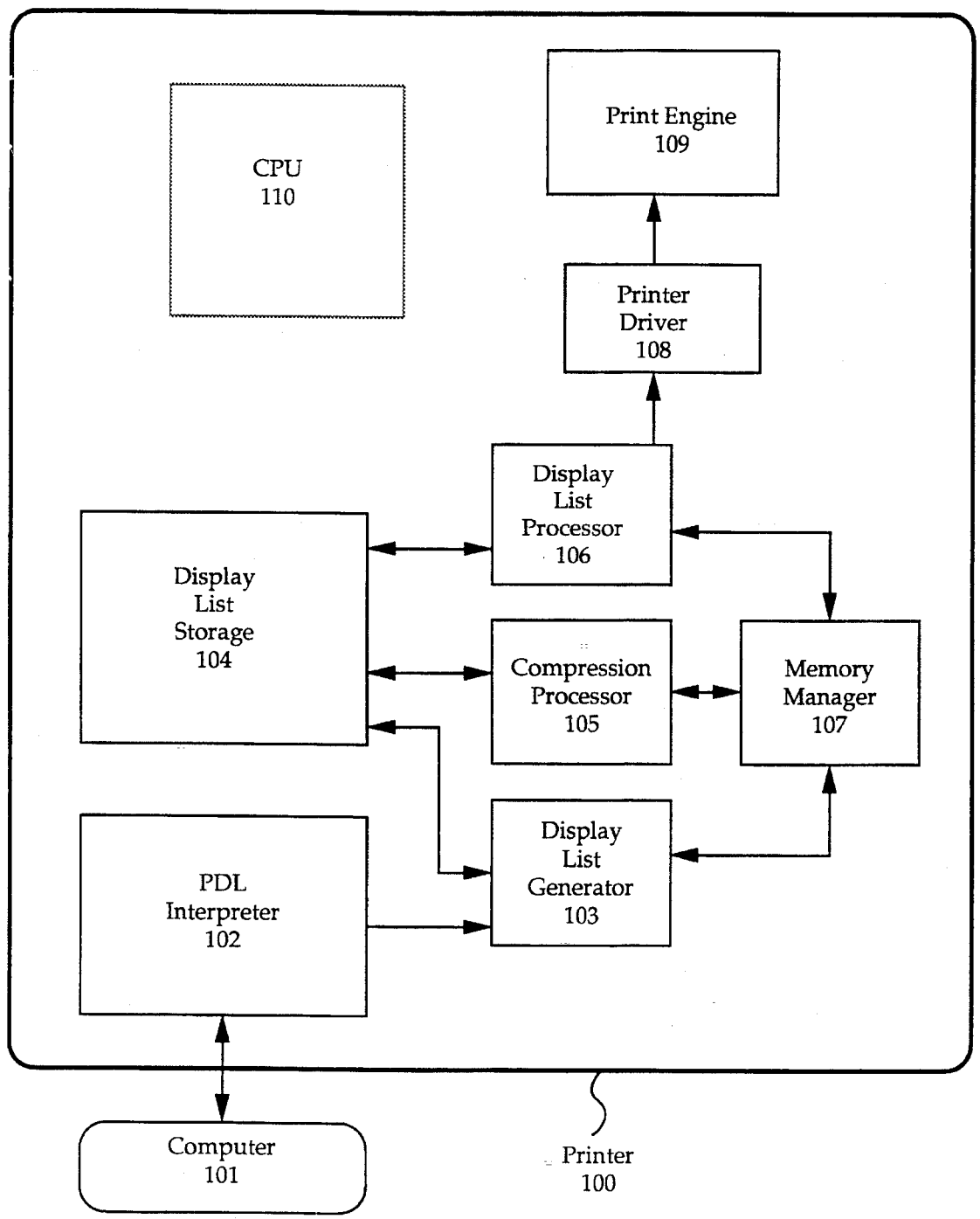
FIG. 1 is a block diagram of a printer in accordance with the present invention.

Many other and different graphic primitives are commonly used. In some instances, a graphic primitive may itself be a pixel representation, also known as a pixel map, a bit map, or a raster data representation. The above examples are well known to those practiced in the art. The present invention is not dependent on any particular graphic primitive or representation thereof. Referring now to FIG. 1, there is shown a block diagram of a printer 100 in accordance with the present invention. Printer 100 includes a central processing unit ("CPU") 110, a page description language ("PDL") interpreter 102, a display list storage device 104, a display list generator 103, a compression processor 105, a memory manager 107, a display list processor 106, a printer driver 108, and a print engine 109. Printer 100 receives printing commands in a PDL from an external computer 101 in a conventional manner, for example via SCSI, RS-232, "AppleTalk" or Centronics interfaces. CPU 110 is preferably implemented using a model AMD29005 processor available from Advanced Micro Devices Corporation, but any popular microprocessor, such as an AMD 29000, Intel 80X86, National Semiconductor 32cg16 or Motorola 680X0, may be used in accordance with the invention. To keep FIG. 1 uncluttered, connections between CPU 110 and the other components of printer 100 are not shown, but it should be recognized that CPU 110 is employed to provide processing resources as needed for components 102–109.

In a preferred embodiment, the display list storage device 104 is implemented using conventional dynamic random access memory, specifically one megabyte memory chips available, for instance, from Texas Instruments Corporation. In a typical application having 600 dot per inch resolution for black and white printing on letter- or legal-sized paper, two megabytes of memory is preferably used for display list storage 104, and is also made available as needed for temporary storage by other components of printer 100. In a preferred embodiment, PDL interpreter 102, display list generator 103, compression processor 105, display list processor 106, memory manager 107 and printer driver 108 are not separate physical devices, but are logical devices implemented through stored computer programs operating in conjunction with CPU 110.

In a preferred embodiment, print engine 109 is implemented using a conventional laser print engine available, for instance, from Sharp Corporation, but it should be recognized that other devices could be used in accordance with the invention.

In operation, computer 101 sends high level printing commands to PDL interpreter 102. Interpreter 102 converts those commands to graphic primitives. These primitives are sent to display list generator 103, which creates a number of spatially distinct display lists and stores primitives as appropriate in corresponding ones of those lists. Memory manager 107 maintains a history of access to display list storage 104 via the actions of display list generator 103, compression processor 105 and display list processor 106 and thereby keeps track of the amount of available memory capacity in display list storage 104. If the memory requirements of new graphic primitives being processed by display list generator 103 exceed the available capacity of display list storage 104, memory manager 107 instructs display list generator 103 not to write the new primitives to display list storage 104 until more memory is made available. If available capacity is sufficient for current requirements, display list generator 103 simply stores the new primitives in the appropriate display lists in display list storage 104.

In accordance with the present invention, the type of data stored in display lists may vary. A display list may contain graphic primitives alone, uncompressed pixel representations alone, compressed pixel representations alone, or a combination of graphic primitives and compressed pixel representations. In the latter two cases, compressed pixel representations may be added to and manipulated in display lists in a similar manner to graphic primitives.

Memory manager 107 instructs compression processor 105 to increase available capacity by adaptive compression, as described in greater detail in connection with FIGS. 3(*a*)–5(*a*) and 3(b)–5(*b*).

When all of the commands for processing a particular page have been processed and the corresponding graphic primitives stored in display list storage 104, display list processor reads the display lists in the order needed for printing and converts the display lists to raster form. Since some display lists may already be in uncompressed raster form, this conversion may in some instances be trivial. Printer driver 108, a conventional system software module, then receives this data from display list processor 106, converts it to a form usable by print engine 109, and sends it to print engine 109 to draw the image.

Figure 2:
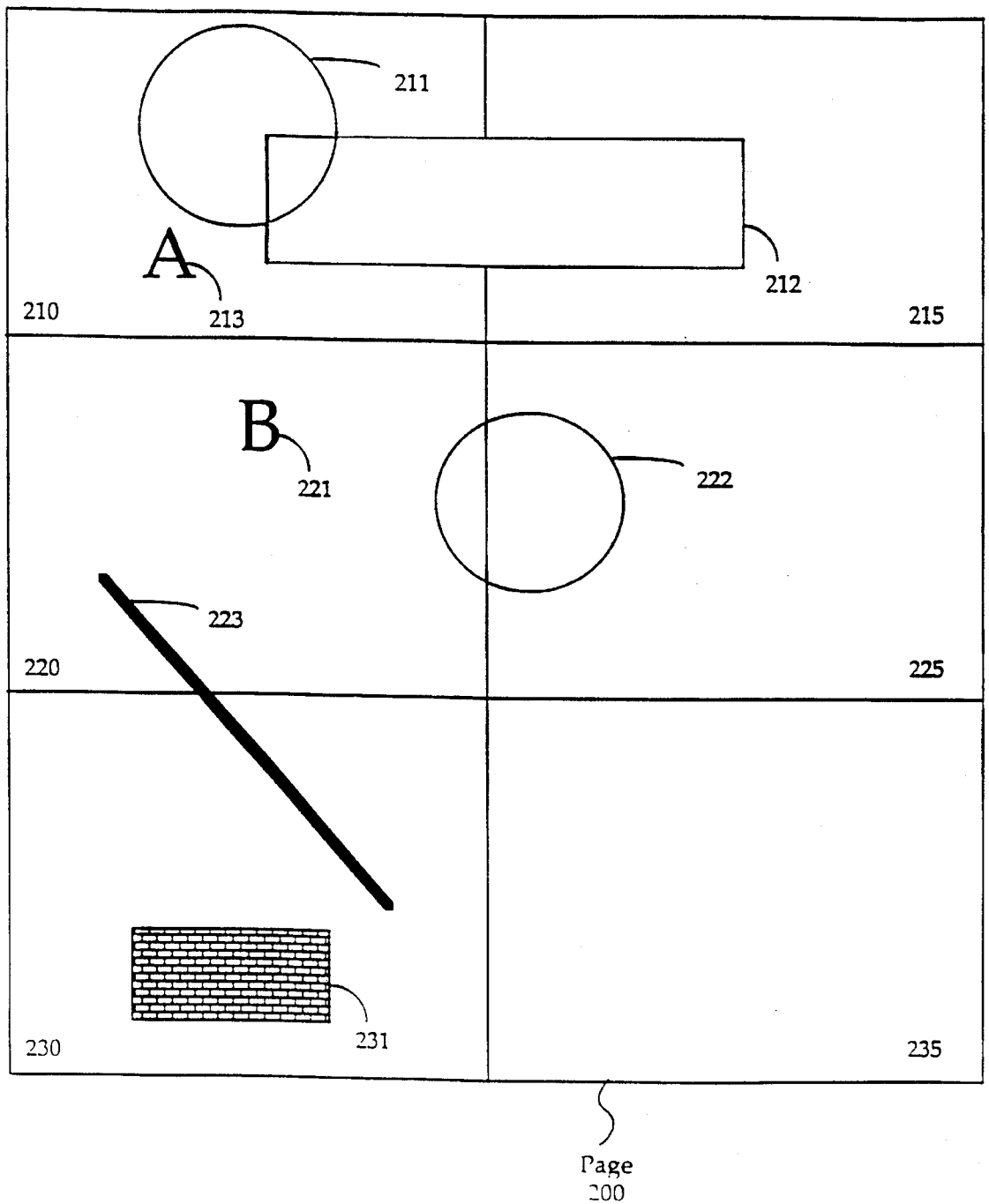
FIG. 2 illustrates division of an image area into a number of segments in accordance with the present invention.

Referring now to FIG. 2, there is shown a representation of a page 200 as a collection of six segments, 210, 215, 220, 225, 230, 235. In a preferred embodiment, a typical page is divided into many more segments, but for clarity of illustration only six segments are illustrated in FIG. 2. It should be recognized any convenient division of a page may be used in accordance with the present invention. For instance, in some cases, efficiencies may dictate purely horizontal divisions to yield segments that extend horizontally across the entire width of a page, while other applications may find both horizontal and vertical divisions advantageous. Page 200 is marked with a number of image elements, specifically letters 213, 221, circles 211, 222, rectangle 215, line 223, and raster data 231.

Referring still to FIG. 2 and again to FIG. 1, as computer 101 sends to printer 100 commands corresponding to these image elements, PDL interpreter 102 and display list generator 103 create graphic primitives for each of six display lists corresponding to segments 210, 215, 220, 225, 230 and 235. Thus, graphic primitives for letter 213, circle 211, and part of rectangle 212 are stored in a display list corresponding to segment 210, a graphic primitive for part of rectangle 212 is stored in a display list corresponding to segment 215, graphic primitives for letter 221, part of circle 222 and part of line 223 are stored in a display list corresponding to segment 220, a graphic primitive for part of circle 222 is stored in a display list corresponding to segment 225, and graphic primitives for part of line 223 and for raster data 231 are stored in a display list corresponding to segment 230. In the example of FIG. 2, no graphic primitives are stored in a display list corresponding to segment 235.

Referring now to FIG. 3(*a*), there is shown a flow diagram of processing in accordance with the present invention. Processing begins by acquiring 301 a PDL command, or "instruction", from computer 101. Next, primitives corresponding to that instruction are generated 302. These primitives are termed "driver primitives" to distinguish them from the display list primitives, discussed below, that are stored in lists corresponding to each segment, e.g., segment 235 of FIG. 2. In some cases, an instruction may result in only one driver primitive, while in other cases, an instruction may generate more than one driver primitive. One of these driver primitives is obtained 303, and a determination is made 304 as to which segments are affected by such driver primitive. For example, an instruction corresponding to circle 211 of FIG. 2 only affects segment 210. One of the affected segments is then obtained 305, and display list primitives for that segment are generated 306. Next, the display list for the current segment is updated 307 as will be described in greater detail in connection with FIG. 4(*a*).

At this point, a check 308 is made to determine whether any segments still need to be processed for the current driver primitive. If so, the next segment is obtained 305 and processing continues as described above. Otherwise, a check 309 is made to determine whether any driver primitives still need to be processed for the current PDL instruction. If so, the next driver primitive is obtained 303 and processing continues as described above. Otherwise, a check 310 is made to determine whether any PDL commands remain to be processed. If so, the next PDL instruction is obtained 301 and processing continues as described above. Otherwise, processing is complete 311.

Figure 3A:
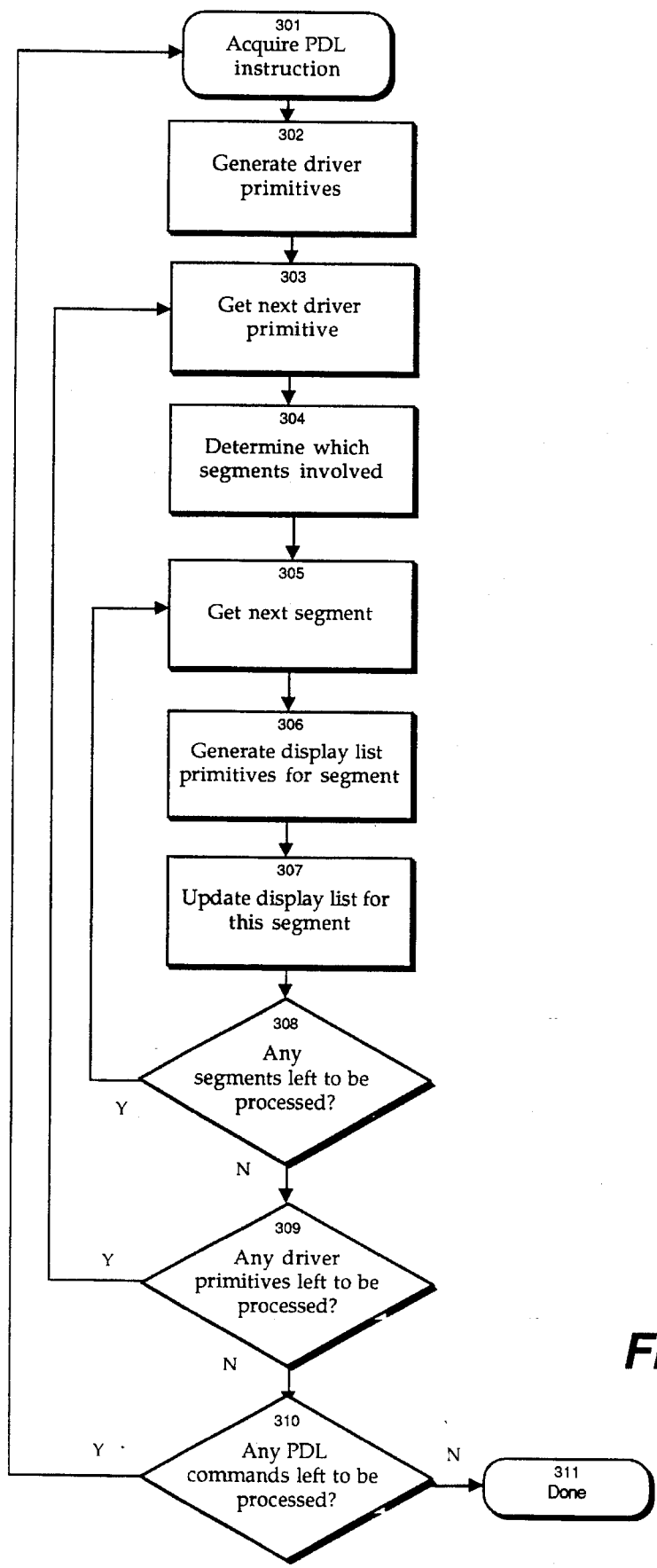
FIG. 3 (a) is a flow diagram of a printing process in accordance with the present invention.
FIG. 3(b) is a flow diagram of another printing process in accordance with the present invention.
Figure 4A:
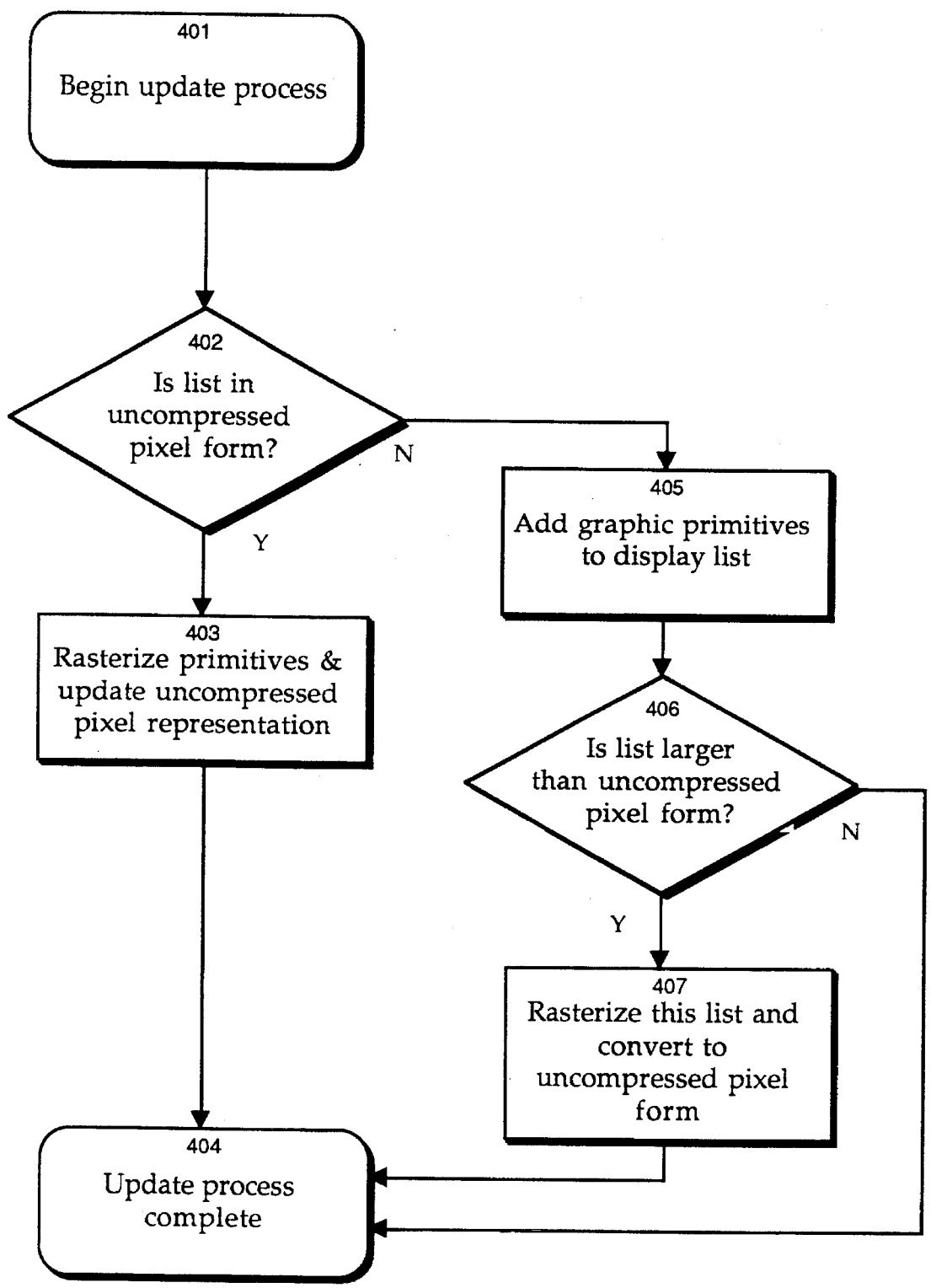
FIG. 4 (a) is a flow diagram of an update process corresponding with the flow of FIG. 3(a) in accordance with the present invention.
FIG. 4(b) is a flow diagram of an update process corresponding with the flow of FIG. 3 (b) in accordance with the present invention.

Referring now to FIG. 4(a), there is illustrated in greater detail the update processing 307 described in connection with FIG. 3(a). Once update processing commences 401, a check 402 is made to determine whether the display list corresponding to the current segment contains only an uncompressed pixel representation, or "raster data". Normally, display lists are loaded with graphic primitives that contain low-level drawing instructions, but some graphic primitives are themselves pixel representations of an image.

If the display list for the current segment is in uncompressed raster form, the new graphic primitive or primitives are also rasterized, i.e., converted to pixel representations, and combined 403 with the existing pixel representations, and the update process is then complete 404. If the display list is in any other form, the new graphic primitives are added 405 to the display list. A check 406 is then made to determine whether the list is now larger than it would be in uncompressed form. The size of a display list in uncompressed form is a constant, i.e., the amount of memory that is required to store a pixel map representative of the segment. If check 406 indicates that the list is larger than the uncompressed form, the entire list is rasterized and converted 407 to uncompressed pixel form. Either way, processing is then complete 404 and processing continues to flow from the point at which the update process was called.

Figure 5A:
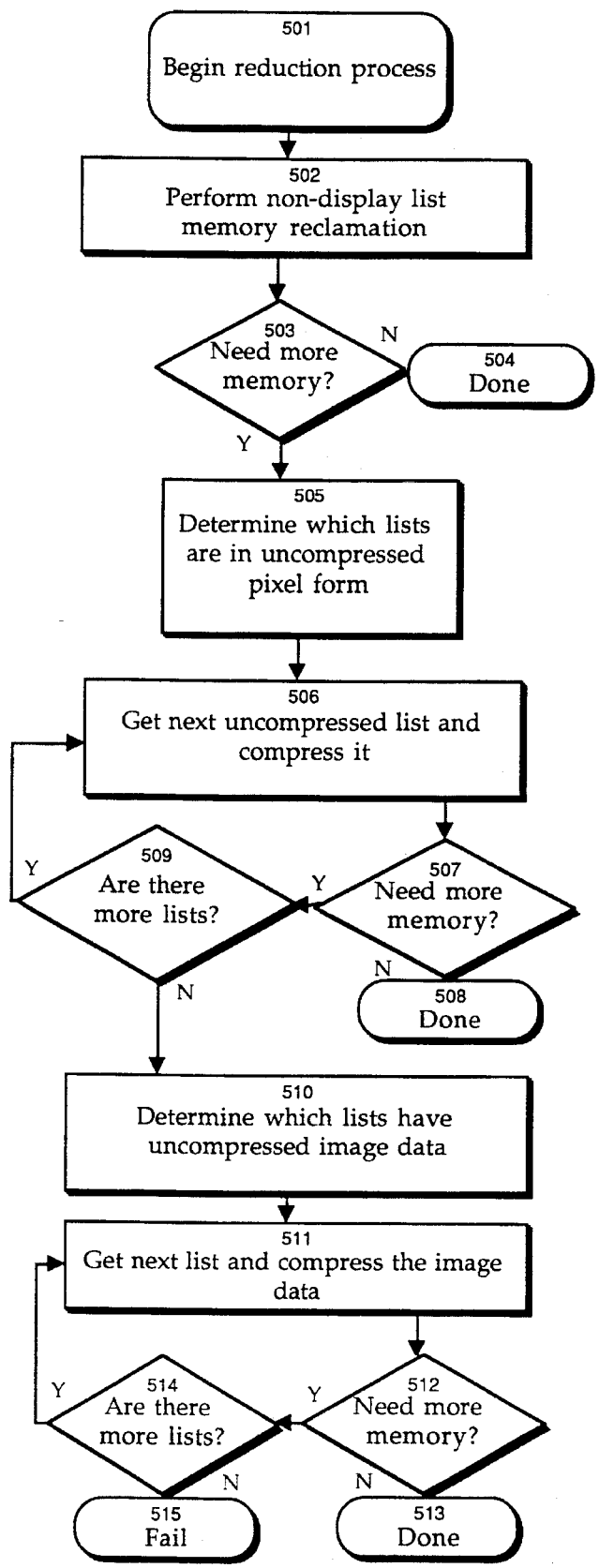
FIG. 5 (a) is a flow diagram of a reduction process corresponding with the flow of FIG. 3 (a) in accordance with the present invention.
FIG. 5(b) is a flow diagram of a reduction process corresponding with the flow of FIG. 3(b) in accordance with the present invention.

Referring now also to FIG. 5(a), there is shown a flow diagram for reduction processing compatible with the processing of FIGS. 3(a) and 4(a). Reduction processing is called at any time that printer 100 needs to perform an operation for which sufficient memory is not currently available. As described above, display lists may contain compressed raster data, compressed raster data and graphic primitives, uncompressed raster data, or exclusively primitives. When reduction processing commences 501, processing first performs 502 all possible conventional memory reclamation techniques not involving the display lists for the current page. For instance, if a page is currently being printed, the memory used for display lists for segments that have already been printed may be freed up for use in connection with the current page. It may also be possible to flush established font or tile caches. Next, a check 503 is made to determine whether more memory is still needed. If not, processing is complete 504. Otherwise, a determination 505 is made as to which display lists are in uncompressed pixel form. One of these lists is obtained and compressed 506, and a check 507 is then made to determine whether more memory is still needed. If not, processing is complete 508. Otherwise, another check is made 509 to determine whether more such lists remain to be processed. If so, the next such list is obtained and compressed 506 and processing continues as described above. If there are no more such lists, a determination 510 is made as to which lists contain at least some image data that is in uncompressed pixel form. One such list is then obtained, and the image data therein is compressed 511. A check 512 is then made to determine whether more memory is still required. If not, processing is complete 513. Otherwise, another check 514 is made to determine whether there are more such lists. If so, the next list is obtained and the image data therein is compressed 511, and processing continues as described above. If there are not any more lists, the reduction process terminates in failure 515, and an appropriate error message is generated. In this embodiment the well-known Lempel-Ziv-Welch or "LZW" compression technique is used for the compression, but any suitable compression scheme could be used in accordance with the invention.

Figure 3B:
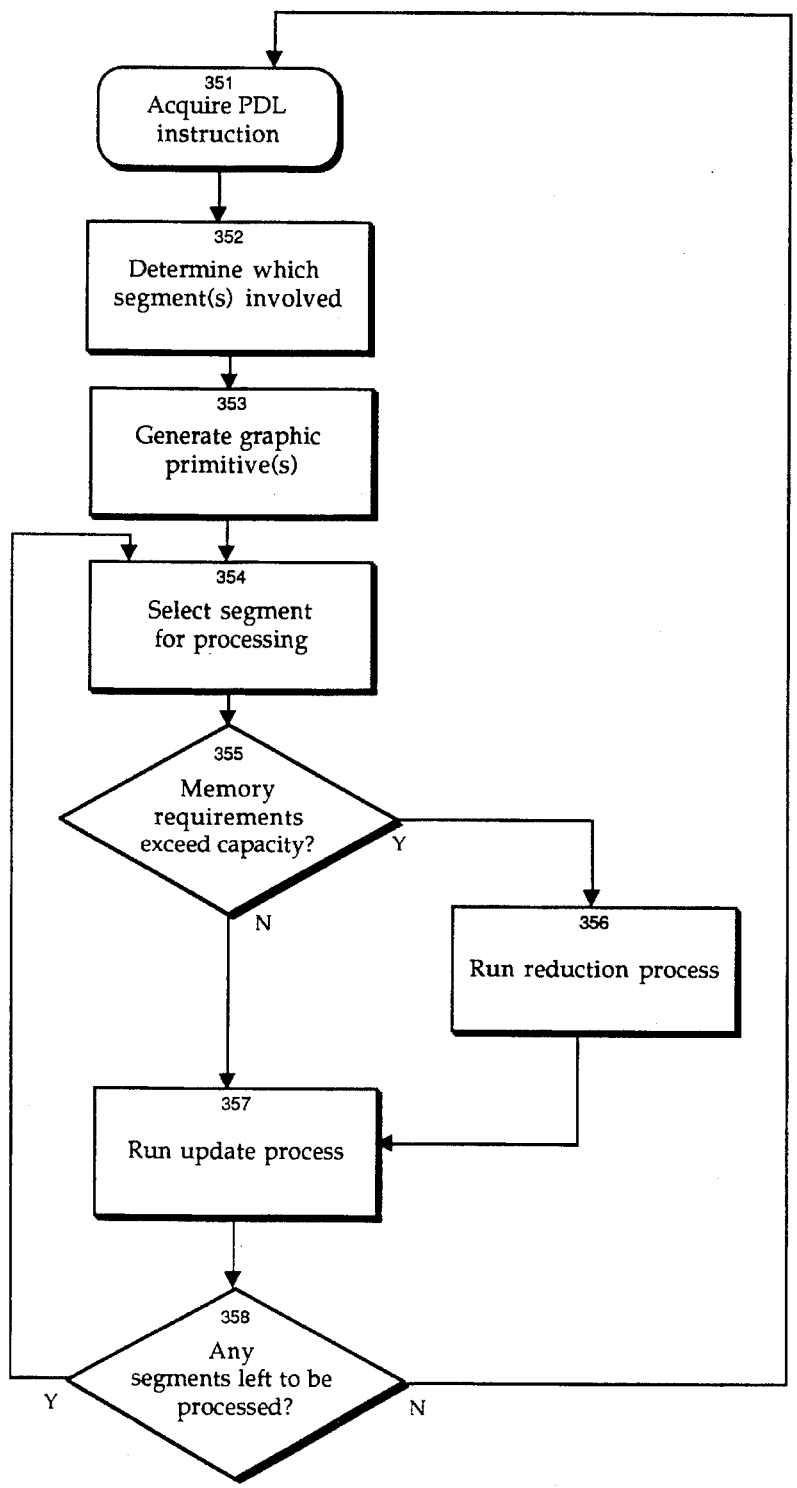

Referring now to FIG. 3(b), there is shown an alternate flow diagram of processing in accordance with the present invention. Processing begins by acquiring 351 a PDL command, or "instruction", from computer 101. Next, a determination is made 352 as to which segments are affected by such instruction, as described above in connection with FIG. 3(a). In some cases, an instruction may result in a single primitive while in other cases, a single high level instruction may be interpreted as comprising several primitives. Furthermore, an instruction for an image element that crosses segment boundaries, such as circle 222 of FIG. 2, is decomposed into separate graphic primitives, one for each segment. In the case of circle 222, two arc primitives would be generated, one for segment 220 and one for segment 225. It should be recognized that the determination 352 of which segments are involved and the generation 353 of graphic primitive(s) need not occur in the order indicated in FIG. 3(b).

After a determination 352 is made and graphic primitives are generated 353, one of the affected segments is selected for processing 354 to add the graphic primitive or primitives that will affect that segment to the display list corresponding to that segment. A check 355 is made to determine whether the amount of memory needed to store these new primitives exceeds the memory capacity that is available. In this embodiment, memory is allocated dynamically as needed, so the determination of memory capacity refers to overall capacity of display list storage area 104 rather than any particular partition allocated exclusively for any particular segment, e.g., 210. However, it should be recognized that similar processing could be used in situations involving static memory allocation as well. If check 355 indicates that memory requirements for the current graphic primitives do not exceed capacity, the corresponding display list is updated with the new graphic primitives by update process 357. Otherwise, reduction process 356 is run before processing flows to update process 357. Update process 357 is detailed in connection with FIG. 4(b) below, and reduction process 356 is detailed in connection with FIG. 5(b). After update process 357 has been run, a check 358 is made to see whether there are any affected segments that have not yet been processed. If so, another affected segment is selected 354 and processing continues as described above. Otherwise, a new PDL instruction is acquired 351, and processing continues as described above.

Figure 4B:
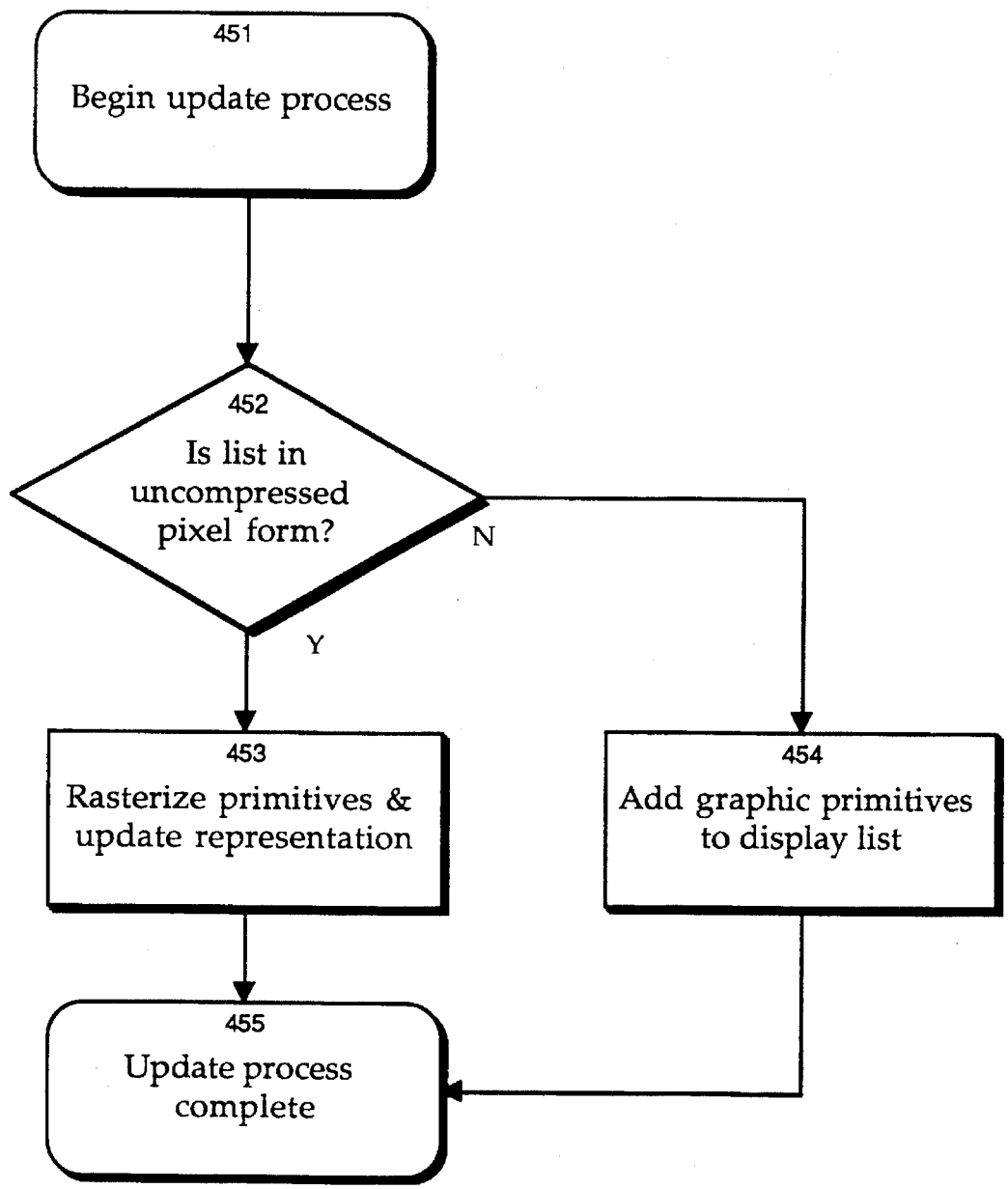

Referring now also to FIG. 4(b), there is shown in greater detail update processing as set forth with respect to FIG. 3(b). Once such update processing commences 451, a check 452 is made to determine whether the display list corresponding to the current segment contains only an uncompressed pixel representation, or "raster data".

If the display list for the current segment is in uncompressed raster form as determined by check 452, the new graphic primitive or primitives are also rasterized, i.e., converted to pixel representations, and combined 453 with the existing pixel representations. If one of the new graphic primitives is already in pixel form, no such conversion need be performed for that primitive. If the display list is in any other form, as described below, the new graphic primitives are simply added 454 to the display list. Either way, processing is then complete 455 and processing continues to flow from the point at which the update process was called.

Figure 5B:
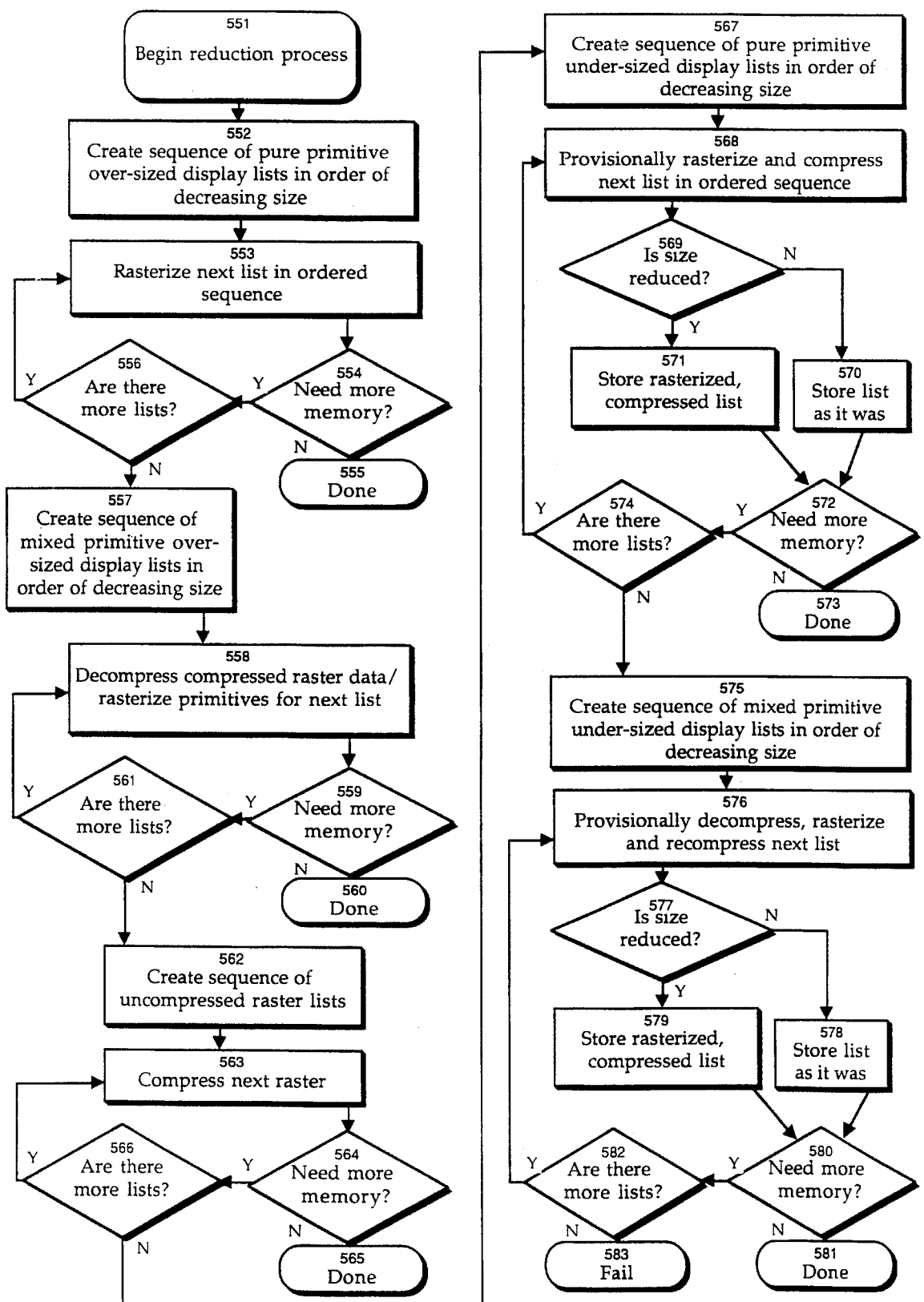

Referring now also to FIG. 5(b), there is shown a flow diagram for the reduction processing discussed in connection with FIG. 3(b). As described above, display lists may contain compressed raster data, compressed raster data and graphic primitives, uncompressed raster data, or exclusively primitives. Different reduction processing is used for a display list depending on whether it is over-sized or under-sized, using a definition of "over-sized" as a list that is larger than the size of an uncompressed raster representation of an entire segment. This may be the case, for instance, where a very large number of graphic primitives for simple shapes are included in the display list. An "under-sized" list is defined as any list that is smaller or equal in size to an uncompressed raster representation of an entire segment. For example, if each segment is defined as being 600 pixels wide by 100 pixels high, and each pixel requires 1 bit of storage, a display list will be considered over-sized if it requires more than 600×100×1 bits of memory, since that is the amount of memory that would be used for an uncompressed raster representation of the segment. When reduction processing commences 551, all of the over-sized display lists that consist solely of graphic primitives are first sequenced 552 to be in decreasing size order so that reduction begins with the largest such list. One of the lists is then selected and rasterized 553 in accordance with the sequential ordering 552. Since the selected list is an over-sized list, such rasterization should result in some reduction of the memory required for storage of that list. A check 554 is then made to determine whether there is presently a need to make yet more memory available. If not, the reduction process is complete 555 and processing continues to flow from the point at which the update process was called. Otherwise, a check 556 is made to determine whether there are more over-sized lists that consist exclusively of graphic primitives. If so, processing returns to the rasterization 553 for a subsequent list.

If check 556 indicates that there are no more over-sized display lists that consist solely of graphic primitives, another sequencing 557 is performed in which over-sized display lists that are "mixed", in the sense that they each contain at least one raster representation (whether compressed or not) in addition to any graphic primitives, are placed in order of decreasing size. The largest such list is then processed 558 by decompressing, if necessary, the raster representations and rasterizing the graphic primitives in that list, thereby converting the list to an overall uncompressed raster representation. A check 559 is then made to determine whether there is presently a need to make yet more memory available. If not, the reduction process is complete 560. Otherwise, a check 561 is made to determine whether there are more mixed primitive over-sized lists to process. If so, processing returns to the decompression and rasterization 558 for a subsequent list.

If check 561 indicates that there are no further mixed primitive over-sized lists to process, yet another sequence of lists is created 562, this time of lists that each contain only an uncompressed raster representation. In sequence, each such raster representation is compressed 563, a check 564 is made to determine whether there is presently a need to make yet more memory available, if so another check 566 is made to determine whether there are more such lists, and if so processing flows again to compression 563 for the next raster representation list. If check 564 indicates that no further memory is required, the reduction process is complete 565. In this embodiment the well-known Lempel-Ziv-Welch or "LZW" compression technique is used for the compression, but any suitable compression scheme could be used in accordance with the invention.

If check 566 indicates that there are no further raster representation lists to process, yet another sequence, this time of under-sized display lists consisting solely of graphic primitives, is created 567 in order of decreasing size. A provisional rasterization and compression is then performed 568 on the largest such list. A check 569 is then made to determine whether the size of the list is reduced by the rasterization and compression. If not, the list is stored 570 in its original form. Otherwise, the rasterized, compressed form of the list is stored 571. In either event, a check 572 is then made to determine whether more memory is required. If not, the reduction process is complete 573. Otherwise, a check 574 is made to determine whether there are more such lists. If so, the next list in the sequence is rasterized and compressed 568.

If check 574 indicates that there are not more under-sized display lists consisting solely of graphic primitives, a new sequence of lists having both graphic primitives and raster representations is created 575 and placed in order of decreasing size. A provisional decompression of the raster data (if it was compressed), rasterization of the graphic primitives, and recompression of the resulting raster representation is then performed 576 on the largest such list. A check 577 is then made to determine whether the size of the list is reduced by the decompression, rasterization and recompression. If not, the list is stored 578 in its original form. Otherwise, the rasterized, compressed form of the list is stored 579. In either event, a check 580 is then made to determine whether more memory is still required. If not, the reduction process is complete 581. Otherwise, a check 582 is made to determine whether there are more such lists. If so, the next list in the sequence is decompressed, rasterized and recompressed 576. Otherwise, the reduction process is considered to fail 583, in which case an appropriate error message such as "memory overload" is generated.

The reduction processes described in FIGS. 5(a) and 5(b) are adaptive in several ways. First, compression is only performed when needed to increase available memory capacity. This is advantageous because both compression and decompression require processing resources and time to complete. Secondly, display lists are maintained in different formats depending on the nature of the image elements in the corresponding segments. Where a display list containing a compressed pixel representation is supplemented by a single graphic primitive at the end of a stream of PDL commands, it may not be worthwhile to re-process that display list to obtain a more compact form. However, if many additional graphic primitives are added, and more space is required, either for that display list or for another, such processing may increase overall efficiency. Finally, some techniques such as the provisional processing 568, 576 may reduce memory requirements in some situations and increase memory requirements in other situations, so checks 569, 577 are used to ensure that such processing is applied only when it is appropriate to do so.

It should be recognized that the reduction processing discussed above in connection with FIGS. 5(b) need not be invoked only as described in connection with FIG. 3(b), but may, like the reduction processing of FIG. 5(a), be invoked whenever it may be desirable to free up space in display list storage device 104 for other purposes. For instance, display list storage device 104 may also be used as a font cache, and a change in currently accessible fonts may call for additional storage requirements.

From the above description, it will be apparent that the invention disclosed herein provides a novel and advantageous digital printing system and process which conserves memory and increases processing speed by selective use of adaptive compression techniques. The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A computer-implemented process of drawing an image on an imaging area of a computer output device in response to commands generated by a computer, the process comprising:

spatially dividing the imaging area into a plurality of sections;

creating a plurality of display lists, each of the display lists corresponding to one of the sections;

determining, for a current one of the commands, a subset of the sections to which said current command pertains;

generating a graphic primitive for a selected one of the subset of sections;

updating with said graphic primitive one of said plurality of display lists corresponding to said selected section;

adaptively reducing a subset of said plurality of display lists responsive to a memory requirement exceeding an available memory capacity by determining a type for each display list responsive to presence therein of a pixel representation and responsive to presence therein of a graphic primitive representation; and drawing said image responsive to said updated display list.

2. A computer-implemented process as in claim 1, wherein adaptively reducing comprises:

determining a first subset of the display lists, each of the display lists in the first subset having present therein solely an uncompressed pixel form representation;

converting a first display list in the first subset to a compressed pixel form representation;

selectively converting at least one additional display list in the first subset to a compressed pixel form representation, responsive to need for more memory;

selectively determining a second subset of the display lists, each of the display lists having present therein uncompressed image data, responsive to need for more memory; and selectively compressing at least one display list in the second subset responsive to need for more memory.

3. A computer-implemented process as in claim 1, wherein updating comprises:

converting, in response to the display list containing only an uncompressed pixel representation, the graphic primitive to an intermediate pixel representation and combining the uncompressed pixel representation with the intermediate pixel representation; and adding, in response to the display list not containing only an uncompressed pixel representation, the graphic primitive to the display list.

4. A computer-implemented process of drawing an image on an imaging area of a computer output device in response to commands generated by a computer, the process comprising:

spatially dividing the imaging area into a plurality of sections;

creating a plurality of display lists, each of the display lists corresponding to one of the sections;

determining, for a current one of the commands, a subset of the sections to which said current command pertains;

generating a graphic primitive for a selected one of the subset of sections;

determining a memory requirement for storing said graphic primitive in one of said display lists corresponding to said selected section;

adaptively reducing a subset of said plurality of display lists responsive to the memory requirements exceeding an available memory capacity by determining a type for each display list responsive to presence therein of a pixel representation and responsive to presence therein of a graphic primitive representation;

updating, subsequent to said step of adaptively compressing, said one display list with said graphic primitive; and drawing said image responsive to said updated display list.

5. A computer-implemented process as in claim 4, wherein adaptively reducing comprises:

determining a first sequential order in decreasing size among a first subset of the display lists, each of the display lists in the first subset having present therein a graphic primitive representation;

selectively converting a display list in the first subset to a pixel representation in accordance with the first sequential order, responsive to the pixel representation being smaller than the graphic primitive representation;

determining a second sequential order in decreasing size among a second subset of the display lists; and selectively compressing a display list in the second subset responsive to the type of each display list indicating presence therein of a pixel representation and responsive to determination that the pixel representation is not already compressed.

6. A computer-implemented process as in claim 5, wherein display lists are selected for conversion and compression responsive to the memory requirement exceeding the available memory capacity.

7. A computer-implemented process as in claim 4, wherein updating comprises:

converting, in response to the display list containing only an uncompressed pixel representation, the graphic primitive to an intermediate pixel representation and combining the uncompressed pixel representation with the intermediate pixel representation; and adding, in response to the display list not containing only an uncompressed pixel representation, the graphic primitive to the display list.

8. A system for displaying an image defined by image data, the system, comprising:

an interpreter disposed to receive the image data and produce graphic primitive and pixel representations therefrom;

a display list storage area including a plurality of segments corresponding to spatially distinct sections of the image;

a display list generator coupled to the interpreter and to the display list storage area and generating for storage in the display list storage area display lists from said representations;

a memory manager coupled to the display list generator and disposed to compare storage requirements for display lists generated by the display list generator with available storage space in the display list storage area;

a compression processor coupled to the memory manager and the display list storage area for adaptively compressing display lists in the display list storage area in response the memory manager indicating storage requirements for display lists exceeding available storage space in the display list storage area, the compression processor disposed to analyze display lists to determine inclusion therein of pixel and graphic primitive components; the compression processor further disposed to selectively decompress, convert between graphic primitive and pixel form, combine, and compress the components of display lists in response to inclusion therein of the components to increase available storage space in display list storage area;

a display list processor coupled to the display list storage area to retrieve display lists from the display list storage area and to produce pixel representations therefrom; and an output device coupled to the display list processor for drawing the image in response to the pixel representations produced by the display list processor.

* * * * *